Patented Mar. 28, 1939

2,152,047

UNITED STATES PATENT OFFICE 2,152,047

PRESERVING AND DISINFECTING MEDIA

Hans Hahl, Ludwig Taub, and Friedrich Leuchs, Wuppertal-Elberfeld, Germany, assignors, by mesne assignments, to Alba Pharmaceutical Company, Inc., New York, N. Y., a corporation of New York No Drawing. Application September 5, 1934, Serial No. 742,800. In Germany September 14, 1933

8 Claims. (Cl. 167—33)

This invention relates to quaternary ammonium compounds of the heterocyclic series.

In accordance with the present invention new products which display a considerable bactericidal action are obtainable by the manufacture of quaternary ammonium compounds of the heterocyclic series containing the quaternary nitrogen atom in nuclear linkage and at least one aliphatic radical of at least 6 carbon atoms combined with the heterocyclic ring system. The aliphatic radical of at least 6 carbon atoms may directly be attached to the heterocyclic ring system or may be combined therewith by other members which are usual as connecting members between organic radicals, for instance, by means of ether-like bound oxygen or sulfur atoms or by means of nitrogen in the form of an amino group. The said aliphatic radical may be saturated or unsaturated and may be in the form of a straight or branched chain. It may contain substituents, such as hydroxyl groups and may be partly composed of an aryl radical, as for instance, the benzyl radical. Further, the aliphatic chain may be interrupted by ether-like bound oxygen or sulfur atoms or by means of amino groups. The heterocyclic component of the new products preferably contains a pyridine nucleus, as for instance, the pyridine radicals themselves as well as quinoline and isoquinoline derivatives or the corresponding hydrogenated products, for instance, piperidine, tetrahydro- and decahydroquinoline radicals, but the invention is not limited to compounds containing the pyridine ring system in the heterocyclic component, for instance, pyrrol, pyrrolidine and thiazole radicals may be used. The said heterocyclic components may be substituted by alkyl, halogen, hydroxyl and nitro groups.

The new quaternary compounds are water-soluble crystalline products or thick viscous oils. Due to their bactericidal activity they may be used as remedies, for instance, as antiseptics. They are likewise suitable quite generally for disinfecting purposes, for instance, for disinfecting medical instruments, bandages, and the like. Since the new products in most cases display also a considerable wetting, foaming and dispersing action they simultaneously may be used as disinfecting cleaning agents. In view of the said properties the new products furthermore represent suitable additions to cosmetic media, such as face water, gargles, and the like. They may be further used as solubilizing agents of water-insoluble products, for instance, drugs, ethereal oils, etc. Their bactericidal properties render them likewise suitable for preserving purposes.

In accordance with the present invention the new products are prepared by reacting upon a heterocyclic nitrogen compound containing an aliphatically bound radical of at least 6 carbon atoms attached to the nucleus either directly or by means of oxygen, sulfur or an amino group, with a reactive derivative of a saturated or unsaturated alcohol or aryl alcohol, such as for instance, the alkyl- or aralkyl halides or their sulfonic, arylsulfonic and phosphoric acid esters, furthermore, halogen hydrines and the like. It may be mentioned that the aliphatically bound radical of at most 6 carbon atoms may also be attached to the nuclear nitrogen atom. The reaction may be carried out in the presence or absence of a solvent or diluent and preferably with heating. In the case a reactive derivative of a higher aliphatic alcohol of at least 6 carbon atoms is used as the alkylating agent in the above process it is not absolutely necessary that the higher aliphatically bound radical of at least 6 carbon atoms is already present in the heterocyclic starting component. It follows that the higher aliphatically bound radical may also be a substituent of the quaternary nitrogen atom.

The invention is further illustrated by the following examples but it is not restricted thereto:—

*Example 1.*—5 parts by weight of 6-hexyloxyquinoline and 3 parts by weight of benzylchloride are heated until the oil mixture has solidified. The quaternary compound, the 6-hexyloxybenzyl-quinoliniumchloride is obtained by recrystallization from alcohol-ether. It forms almost colorless crystals which do not deliquesce when exposed to the air, are readily soluble in water and melt at 160° C.

The 6-hexyloxyquinoline is obtained from 6-hydroxyquinoline and N-hexylbromide in the presence of alkaline condensing agents. It is a colorless oil which boils at 163–165° C. under 5 mm. pressure.

In an analogous manner by the direct action of the components in molecular proportions as well as with the addition of indifferent solvents or diluents, for instance, the following quaternary compounds are obtained as crystalline substances: the 6-benzyloxy-benzyl-quinolinium-chloride melting at 199–200° C. from 6-benzyloxyquinoline and benzylchloride; the 6-dodecyloxy-benzyl-quinoliniumchloride melting at 182–183° C., forming colorless crystals from alcohol-ether, from 6-dodecyloxyquinoline and benzylchloride; the 7-dodecyloxy-benzylquinoliniumchloride melting at 188–189° C., forming yellow needles from alcohol, from 7-dodecyloxyquinoline and benzylchloride; the 6-dodecyloxyhydroxyethylquinoliniumchloride melting at 167–168° C., forming yellow crystals from alcohol-ether, from 6-dodecyloxyquinoline and glycolchlorohydrine; the 6-hexylthiobenzylquinoliniumchloride, forming yellow crystals, from 6-hexylthioquinoline and benzylchloride.

*Example 2.*—5 parts by weight of 6-hexyl-aminoquinoline (by the action of hexylbromide upon 6-aminoquinoline, melting at 64-65° C.) and 2 parts by weight of benzylchloride are heated until the reaction mixture has crystallized. When recrystallized from alcohol the 6-hexyl-amino-benzylquinoliniumchloride obtained forms a crystalline orange-yellow substance melting at 110-111° C.

In an analogous manner also the 6-dodecyl-amino-benzylquinoliniumchloride is obtained from 6-dodecylaminoquinoline (prepared by treating 6-hydroxyquinoline with dodecylamine in a pressure vessel at 230° C., forming a viscous oil boiling at 239° C. under 2 mm. pressure) and benzylchloride. It forms a yellowish powder which dissolves in water to a clear solution.

When heating molecular quantities of benzylchloride and 7-octylaminoquinoline (prepared by reacting with n-octylalcohol upon the hydrochloric acid salt of 7-aminoquinoline in the manner specified above) the 7-n-octylaminobenzyl-quinoliniumchloride is obtained as a yellow, microcrystalline, water-soluble salt. The 7-n-octylaminoquinoline can also be obtained by heating molecular quantities of n-octylalcohol and 7-aminoquinoline in the presence of small quantities of zinc chloride or phosphorus pentoxide.

*Example 3.*—2.2 parts by weight of 2-octyl-amino-5-methylthiazol are heated on the water-bath with 1.5 parts by weight of benzylchloride until the sirup formed is soluble in water. The aqueous solution of the quaternary thiazol derivative formed is stable and has still a disinfecting action when diluted in the proportion of 1:25000.

The 2-octylamino-5-methylthiazol which is used as starting material is obtained from 5-methyl-2-aminothiazol and octylbromide. It is a yellow oil which boils at 186-189° C. under 3 mm. pressure and solidifies to crystals on standing.

*Example 4.*—175 parts by weight of N-benzyl-piperidine are heated with 221 parts by weight of decylbromide for 24 hours to 100° C. After cooling the highly viscous mass is dissolved in the ninefold quantity of distilled water. Thus a yellowish, strongly foaming solution of benzyl-decyl-piperidiniumbromide is obtained.

*Example 5.*—225 parts by weight of N-decyl-piperidine are heated with 126.5 parts by weight of benzylchloride according to Example 5. The crystalline hygroscopic mass formed is the benzyl-decyl-piperidiniumchloride which is readily soluble in alcohol and in water.

In an analogous manner there are obtained the N-benzyl-N-dodecyl-piperidiniumchloride from molecular quantities of benzylchloride and N-dodecylpiperidine; the N-crotyl-N-octadecyl-piperidiniumbromide from N-octadecylpiperidine and crotylbromide; the N-benzyl-N-(β-ethylhexyl)-decahydroquinoliniumbromide from benzylbromide and N-(β-ethylhexyl)-decahydroquinoline; the N-allyl-N-dodecyl-decahydroquinaldiniumbromide from allylbromide and N-dodecyl-decahydroquinaldine; the N-hydroxyethyl-N-dodecyl-piperidiniumchloride from ethylenechlorohydrine and N-dodecylpiperidine; the N-geranyl-N-dodecyl-piperidiniumchloride from geranyl-chloride and N-dodecylpiperidine; the N-decyl-8-chloroquinaldiniumbromide from 8-chloroquinaldine and decylbromide; the N-hexadecyloxymethyl-5-nitro-8-ethoxyquinolinium-chloride from 5-nitro-8-ethoxy-quinoline and hexadecyloxymethylchloride.

*Example 6.*—283 parts by weight of 2-undecyl-quinoline (obtained by condensation of o-aminobenzaldehyde with methylundecylketone in the form of colorless crystals melting at 42° C.) are heated with 126 parts by weight of dimethylsulfate and an equal quantity of nitrobenzene for about 3 hours to 140° C. The nitrobenzene is then evaporated in vacuo and the 2-undecyl-methyl-quinolinium-methylsulfate is obtained in the form of a viscous, gradually solidifying oil which is soluble in water.

When using instead of dimethylsulfate the equivalent quantity of para-toluene-methylsulfonate, 2-undecyl-methyl-quinolinium-para-toluenesulfonate is obtained.

We claim:—

1. A preserving and disinfecting medium comprising as an active ingredient a non-acylated quaternary quinolinium halide containing at least one aliphatic radical of at least 6 carbon atoms combined with the quinoline ring system.

2. A preserving and disinfecting medium comprising as an active ingredient a non-acylated quaternary quinolinium halide containing at least one aliphatic radical of at least 6 carbon atoms combined with the quinolinium nucleus by means of an oxygen atom in either linkage.

3. A preserving and disinfecting medium comprising as an active ingredient an N-benzyl-quinolinium halide containing at least one aliphatic radical of at least 6 carbon atoms combined with the quinoline ring system.

4. A preserving and disinfecting medium comprising as an active ingredient an N-benzyl-quinolinium halide containing at least one aliphatic radical of at least 6 carbon atoms combined with the quinolinium nucleus by means of an oxygen atom in ether linkage.

5. A preserving and disinfecting medium comprising as an active ingredient an N-benzyl-quinolinium chloride containing at least one aliphatic radical of at least 6 carbon atoms combined with the quinolinium nucleus by means of an oxygen atom in ether linkage.

6. A bactericidal preserving and disinfecting medium comprising as an active ingredient a non-acylated quaternary ammonium halide containing only one heterocyclic ring in which the quaternary nitrogen atom is part of a heterocyclic nucleus of the group consisting of pyridine, quinoline, isoquinoline, pyrrol, thiazole and their hydrogenated derivatives, and wherein at least one benzyl radical is combined with the heterocyclic nucleus.

7. A bactericidal preserving and disinfecting medium comprising as an active ingredient a non-acylated quaternary ammonium halide containing only one heterocyclic ring in which the quaternary nitrogen atom is part of a heterocyclic nucleus of the group consisting of pyridine, quinoline, isoquinoline, pyrrol, thiazole and their hydrogenated derivatives, and wherein at least one aliphatic radical of at least six carbon atoms is combined with the heterocyclic nucleus by means of an oxygen atom in ether linkage.

8. A bactericidal preserving and disinfecting medium comprising as an active ingredient a non-acylated quaternary ammonium halide containing only one heterocyclic ring in which the quaternary nitrogen atom is part of a heterocyclic nucleus of the group consisting of pyridine, quinoline, isoquinoline, pyrrol, thiazole and their hydrogenated derivatives, and wherein at least one aliphatic radical of at least six carbon atoms is attached to the quaternary nitrogen atom.

HANS HAHL.
LUDWIG TAUB.
FRIEDRICH LEUCHS.